(12) United States Patent
Liu et al.

(10) Patent No.: US 11,372,531 B2
(45) Date of Patent: Jun. 28, 2022

(54) CONTROLLING DISPLAY DEVICE SETTINGS FROM A MOBILE DEVICE TOUCH INTERFACE

(71) Applicant: ROKU, INC., Los Gatos, CA (US)

(72) Inventors: Steve Shaw-Jong Liu, Mountain View, CA (US); James Harold Shaw, Portland, OR (US); Anita Ranganath, Cupertino, CA (US); Gregory S. Gates, Saratoga, CA (US); Michael Chin-Ming Fu, Cupertino, CA (US); Matthew Wee, San Jose, CA (US); Kevin Ralph Cooper, San Jose, CA (US); Charles L. Smith, Andover, MA (US); Harold Sun, Tigard, OR (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 16/736,283

(22) Filed: Jan. 7, 2020

(65) Prior Publication Data

US 2020/0249827 A1 Aug. 6, 2020

Related U.S. Application Data

(63) Continuation of application No. 15/076,162, filed on Mar. 21, 2016, now Pat. No. 10,528,241.

(51) Int. Cl.
*H04N 21/485* (2011.01)
*H04N 21/422* (2011.01)
(Continued)

(52) U.S. Cl.
CPC ...... *G06F 3/04847* (2013.01); *G06F 3/04842* (2013.01); *G06F 3/04886* (2013.01);
(Continued)

(58) Field of Classification Search
CPC .... G06F 3/04847; G06F 3/04886; G06F 3/14; G06F 3/04842; H04N 21/42204;
(Continued)

(56) References Cited

U.S. PATENT DOCUMENTS 7,870,496 B1 1/2011 Sherwani
2006/0085835 A1 4/2006 Istvan et al.
(Continued)

FOREIGN PATENT DOCUMENTS

WO WO 2000/059212 A2 10/2000

OTHER PUBLICATIONS

International Search Report and Written Opinion of the International Searching Authority directed to related International Patent Application No. PCT/US2017/022723, dated May 19, 2017; 13 pages.
(Continued)

*Primary Examiner* — Jennifer N Welch
*Assistant Examiner* — Amy P Hoang
(74) *Attorney, Agent, or Firm* — Sterne, Kessler, Goldstein & Fox P.L.L.C.

(57) ABSTRACT

System, method, and computer product embodiments for controlling a display device's display settings from a computing device's touch-based user interface are described. In an embodiment, the computing device establishes a wireless connectivity with the display device. The computing device sends a command generated to query information related to the display setting. Then, the computing device receives the queried information from the display device. The computing device configures a graphical user interface (GUI) with the queried information to display configurations of the display settings on the touchscreen. The configurations include the display settings currently configured in the display device. The computing device further enables, within GUI, a dis-
(Continued)

played configuration from the display configurations to be calibrated by one or more touch gestures on the touchscreen.

20 Claims, 14 Drawing Sheets

(51) Int. Cl.
| | |
|---|---|
| *G06F 3/04847* | (2022.01) |
| *G06F 3/04842* | (2022.01) |
| *H04N 21/4363* | (2011.01) |
| *G06F 3/14* | (2006.01) |
| *G06F 3/04886* | (2022.01) |
| *H04N 21/41* | (2011.01) |
| *H04M 1/72415* | (2021.01) |

(52) U.S. Cl.
CPC ......... *G06F 3/14* (2013.01); *H04N 21/41265* (2020.08); *H04N 21/42204* (2013.01); *H04N 21/42224* (2013.01); *H04N 21/43637* (2013.01); *H04N 21/4854* (2013.01); *G09G 2320/0606* (2013.01); *G09G 2320/0693* (2013.01); *G09G 2354/00* (2013.01); *G09G 2370/06* (2013.01); *G09G 2370/16* (2013.01); *H04M 1/72415* (2021.01); *H04N 21/4222* (2013.01)

(58) Field of Classification Search
CPC ....... H04N 21/41265; H04N 21/42224; H04N 21/43637; H04N 21/4854; H04N 21/4222; G09G 2320/0693; G09G 2320/0606; G09G 2354/00; G09G 2370/06; G09G 2370/16; H04M 1/72533
See application file for complete search history.

(56) References Cited

U.S. PATENT DOCUMENTS

| | | | |
|---|---|---|---|
| 2009/0228322 A1 | 9/2009 | van Os et al. | |
| 2012/0240161 A1* | 9/2012 | Kuo | ........................ H04N 21/47 725/37 |
| 2013/0131841 A1 | 5/2013 | Furumoto et al. | |
| 2013/0148033 A1 | 6/2013 | Shintani | |
| 2013/0314598 A1* | 11/2013 | Koizumi | .......... H04N 21/42228 348/564 |
| 2013/0314609 A1* | 11/2013 | Shintani | ................ H04N 21/431 348/734 |
| 2014/0082489 A1 | 3/2014 | Park | |
| 2014/0208224 A1 | 7/2014 | Schubert et al. | |
| 2014/0304736 A1 | 10/2014 | Lai | |
| 2014/0313419 A1* | 10/2014 | Kim | ................... H04N 21/4131 348/734 |
| 2014/0351753 A1 | 11/2014 | Shin et al. | |
| 2015/0304265 A1* | 10/2015 | Vincent | ................... H04L 51/24 709/206 |
| 2015/0334334 A1 | 11/2015 | White et al. | |

OTHER PUBLICATIONS

International Preliminary Report on Patentability of the International Searching Authority directed to related International Patent Application No. PCT/US2017/022723, dated Sep. 25, 2018; 12 pages.

* cited by examiner

CONTROLLING DISPLAY DEVICE SETTINGS FROM A MOBILE DEVICE TOUCH INTERFACE

RELATED APPLICATIONS

This application is a continuation of U.S. Nonprovisional patent application Ser. No. 15/076,162, filed on Mar. 21, 2016, issued as U.S. Pat. No. 10,528,241 titled "Controlling Display Device Settings From a Mobile Device Touch Interface," and the contents of which are hereby incorporated herein by reference in its entirety.

FIELD

This disclosure is generally directed to controlling display device settings.

BACKGROUND

Modern televisions (TVs) have highly configurable TV displays, with many configurable picture settings for selecting and configuring content. To enable a content consumer to control operations of the TV and these picture settings, a pre-programmed physical TV remote is usually provided to operate with the TV. Conventional TV remotes, however, have static user interfaces (e.g., with physical control keys or buttons) with limited input options (e.g., key-press only) for selecting content and adjusting the picture settings of the TV.

BRIEF SUMMARY

Provided herein are system, method, apparatus, and computer program product embodiments, and/or combinations and sub-combinations thereof, for controlling display settings in a display device from a touch-based user interface of a computing device.

In an embodiment, a method for controlling the display settings at the display device may be implemented by a computing device. The method may operate by establishing a wireless connectivity with a display device having configurable display settings; transmitting, via the wireless connectivity, a command generated to query information related to the display settings; receiving the queried information from the display device; configuring a GUI with the queried information to display configurations of the display settings on a touchscreen of the computing device, wherein the configurations include the display settings currently configured in the display device; and enabling within the GUI, a displayed configuration from the display configurations to be calibrated by one or more touch gestures on the touchscreen.

In an embodiment, a method for enabling control of display settings from the computing device may be implemented by the display device. The method may operate by providing configurable display settings for a display; storing information related to the display settings in a memory; establishing a wireless connectivity with the computing device; receiving, from the computing device via the wireless connectivity, a command to query information related to the display setting; and transmitting, to the computing device, the information queried from the memory, wherein the transmitted information is used by the computing device to configure a GUI to display configurations of the display settings on a touchscreen of the computing device, wherein the configurations include the display settings currently configured in the display.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
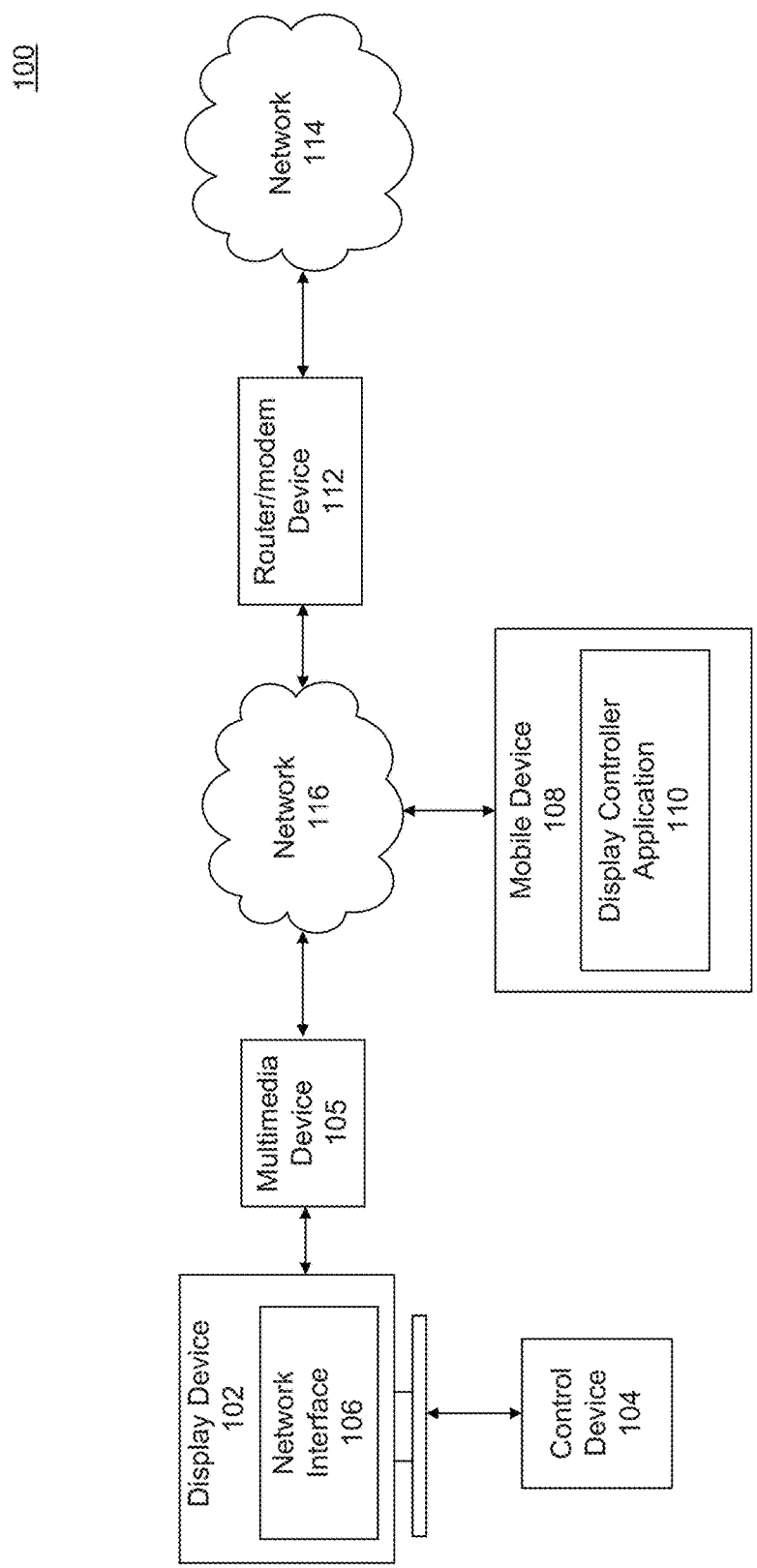
FIG. 1 is a block diagram of a system for providing control of display settings of a display device from a mobile device, according to an embodiment.

FIG. 1 illustrates a system 100 for providing control of display settings on display device 102 from mobile device 108, according to an example embodiment. Display settings may include picture settings or other hardware-based settings, e.g., volume level of speakers, of display device 102. System 100 includes display device 102, control device 104, mobile device 108, and router/modem device 112. In an embodiment, devices of system 100 may be in close proximity and capable of communicating with each other via network 116 provided by router/modem device 112. Network 116 may be representative of a network, such as a local area network (LAN), provided via wired and/or wireless protocols. As shown, network 116 may be connected to another network, such as the Internet, represented by network 114, via router/modem device 112. Other communication technologies can also or alternatively be used for network 114 and/or 116 such as but not limited to Bluetooth, Wi-Fi, cellular, etc.

Router/modem device 112 may be one or more networking devices that enables the devices of system 100 (e.g., display device 102 or mobile device 108) to access network 114 via network 116. For example, router/modem device 112 may be a single modem device having router capabilities. Network 114 may include any combination of LANs, wide area networks (WANs), the Internet, short-, medium-, and long-range communication protocols, and/or any other local, regional, and global telecommunications networks. In an embodiment, network 114 may include private, public, academic, business, and government networks. Network 114 may be implemented based on wired and/or wireless communication techniques, protocols, and technologies.

Multimedia device 105 may be a computing device that manages and provides multimedia content to be output or presented on display device 102. Multimedia device 105 may receive the multimedia content from a content provider over network 114, e.g., the Internet. Multimedia content may be data that is a combination of one or more of text, audio, still images, video, etc. For example, multimedia content may include movies, television episodes, advertisements, commercials, news, streaming channels, video clips, video games, on-demand video content, and photos etc.

In an embodiment, multimedia device 105 may be a streaming stick or streaming player that is coupled to or integrated within (i.e., implemented as part of) display device 102. Multimedia device 105 may also be coupled to other computing devices, such as a digital video recorder (DVR) or a digital video disc (DVD) player. The coupling may be provided via a variety of cabling methods, such as via composite cables, DVI cables, or HDMI cables. In an embodiment, the coupling may be provide by network 116 over, for example, Ethernet cable, Wi-Fi, or Bluetooth.

Display device 102 may be a hardware device specifically designed for viewing multimedia content including images, video, webpages, games, audio, interactive content, etc. In an embodiment, display device may receive and display multimedia content from multimedia device 105, a cable provided by a cable provider, a satellite, or any combination thereof. Additionally, display device 102 may employ technologies (e.g., 3D, high definition, 4K, etc.) for improving a viewing experience or a picture quality of the multimedia content. In an embodiment, display device 102 may be a monitor, a television, a projector display or any other type of display.

In an embodiment, to enable a content consumer to calibrate a picture quality of displayed content, display device 102 may be implemented with many configurable picture quality settings, also referred to as display settings or picture settings. A picture setting may be, for example and without limitation, a color temperature or a noise reduction mode. In an embodiment, display device 102 also provides a content consumer the capability to control other hardware settings (e.g., on/off, volume level, audio tones, sleep mode/timer, etc.) that affect the overall user experience for consuming multimedia content. In an embodiment, display device 102 is implemented with firmware that provides a menu-based interface displayed by display device 102. The menu-based interface allows the content consumer to use a pre-programmed remote control, such as control device 104 further described below, to navigate through and adjust specific picture settings displayed on display device 102.

In an embodiment, to provide control of the picture settings and other hardware settings of display device 102 to mobile device 108, display device 102 may include communications interface 106. Communications interface 106 may include network hardware for communicating with mobile device 108 via network 116. For example, network hardware may include, but is not limited to, one or more of Ethernet cable, Wi-Fi network chip, Bluetooth chip, or other communications technology circuits.

Figure 2:
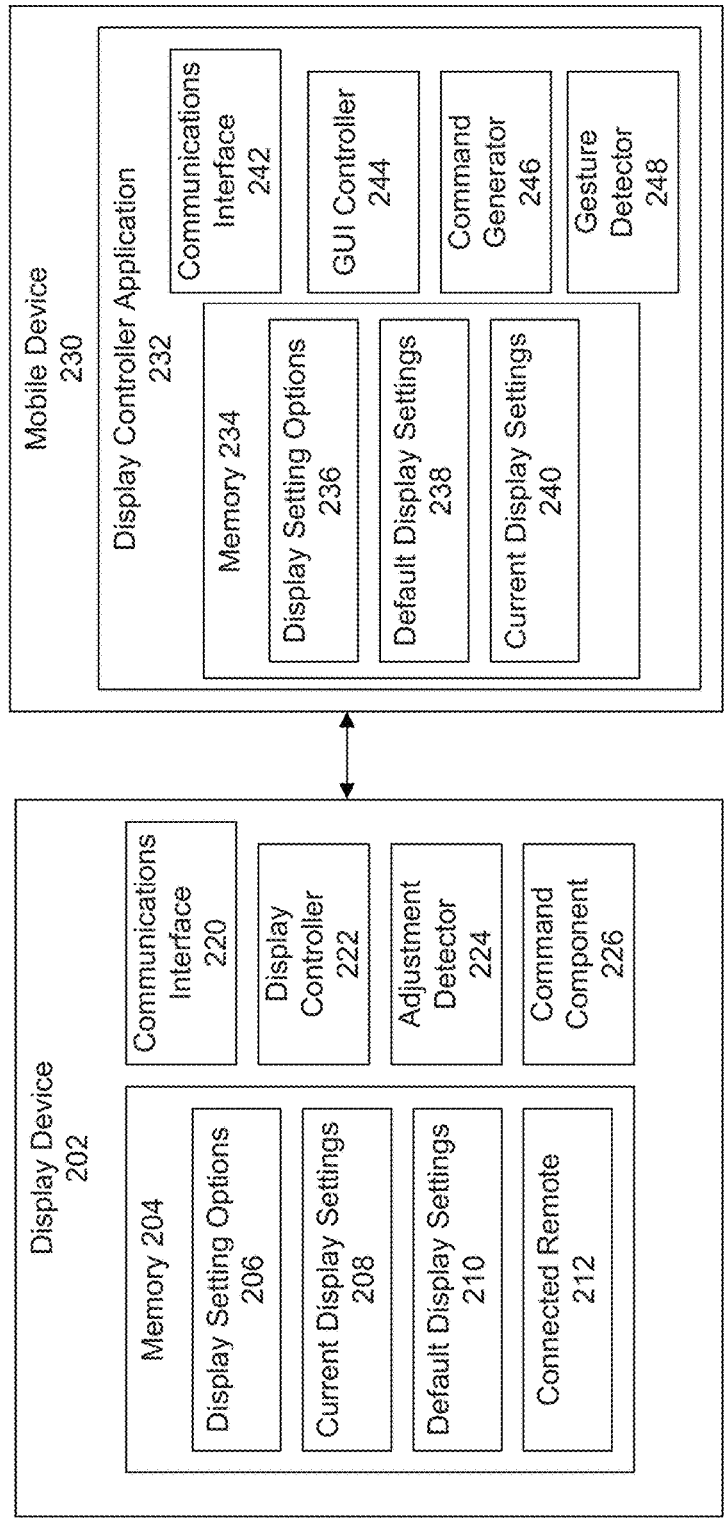
FIG. 2 is a block diagram of a system illustrating example components within a display device and a mobile device, according to an example embodiment.
Figure 12A:
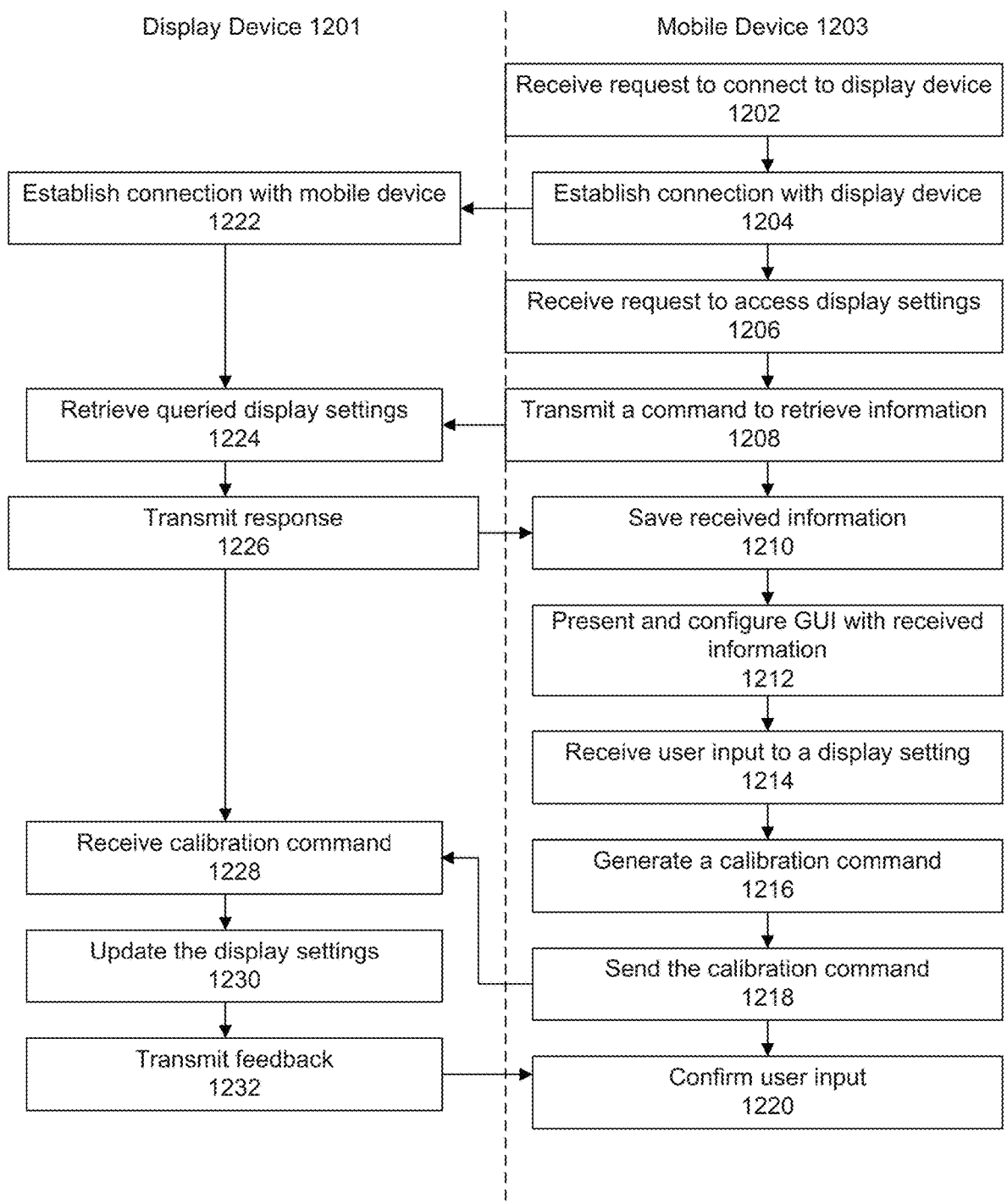
FIGS. 12A-B are flowcharts of methods for providing control of display device settings, according to an example embodiment.
Figure 12B:
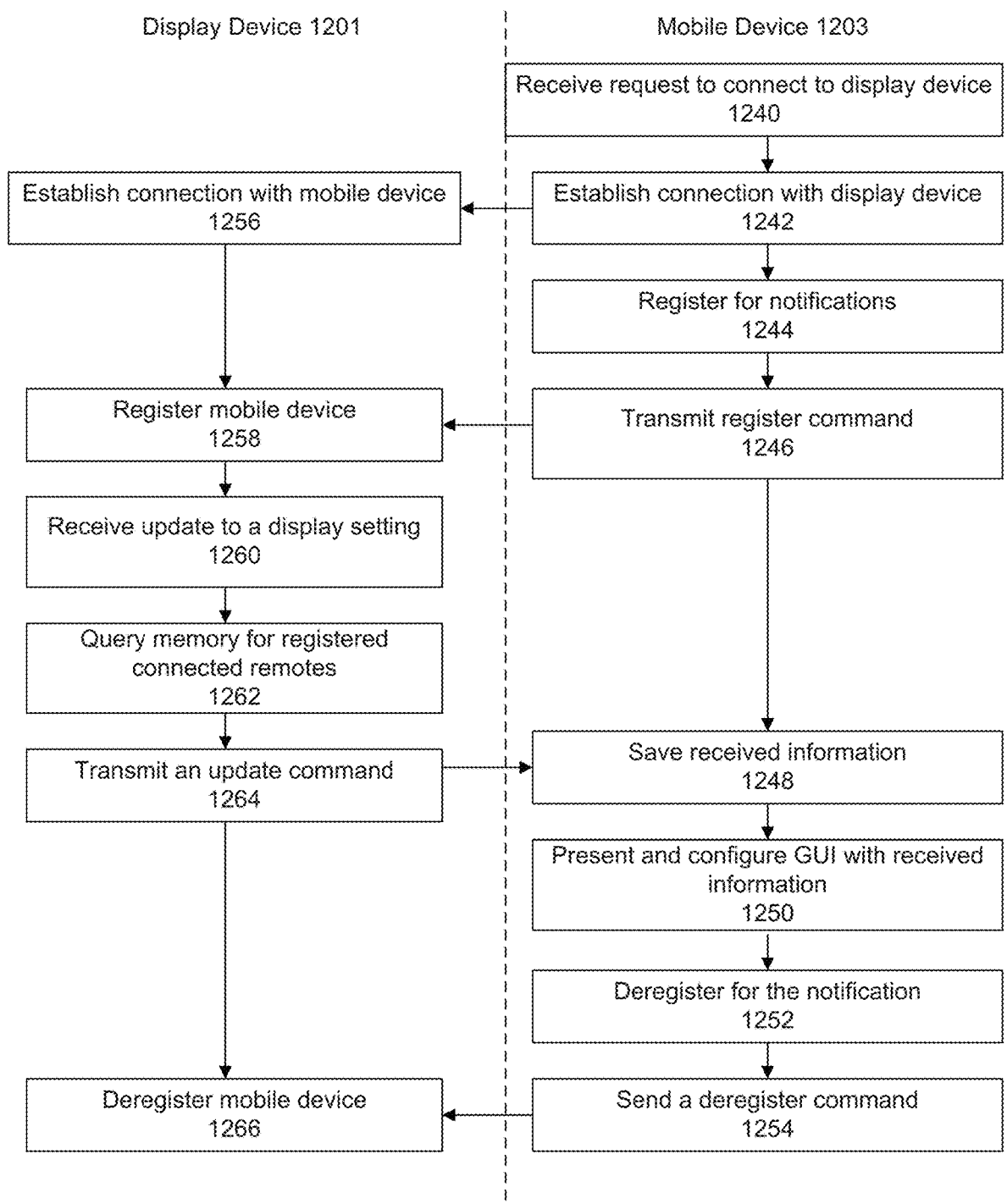

As described with respect to FIGS. 2 and 12A-B, display device 102 may use communications interface 106 to transmit information related to the picture settings (or other hardware settings) upon request from mobile device 108. By transmitting picture settings and related information, display device 102 enables mobile device 108 to provide a more user-friendly, intuitive, touch-based, and easily-customizable graphical user interface for controlling the picture setting or other display settings. Additionally, presenting and interacting with the picture settings (and related information) on mobile device 108 offloads the complexities and processing of such interactions on display device 102. As a result, display device 102 operates and presents on the display screen a simplified, more streamlined GUI. Offloading the presentation of the picture settings to mobile device 108 also reduces the amount of space that the GUI takes up on the display screen, maximizing the display of visual content. In an embodiment, display device 102 may detect whether a remote, such as one implementation of control device 104, is sending control instructions. To service the remote, display device 102 may still provide a menu-based and static user interface displayed on display device 102. For example, the remote may have a physical input interface and may not be capable of receiving information from display device 102.

In an embodiment, communications interface 106 may concurrently enable display device 102 to receive and process control commands from one or more remotes, such as control device 104 and mobile device 108 simulating a remote, via network 116. Upon receiving a control command from any remote to adjust, for example, a picture setting, display device 102 may configure the internal picture settings accordingly. In an embodiment, display device 102 may then transmit updates to remotes, such as mobile device 108, that have been registered to receive notification of specific updates. Therefore, communications interface 106 enables two-way data and command exchanges between display device 102 and mobile device 108.

Control device 104 may be a portable and wireless device that issues commands to display device 102 to control, for example, picture settings or other hardware settings. In an embodiment, control device 116 may be a remote control configured to interact with multimedia device 105 and other devices, such as DVD players, or DVRs etc. In an embodiment, control device 104 may be representative of a remote control that issues commands through infrared.

In an embodiment, control device 104 may be representative of a remote control having a static user interface with limited input options. The static user interface may be, for example, a set of physical buttons or keys. With regard to input options, the content consumer may be limited to clicks or presses of one or more physical buttons to configure pictures settings that may be presented on a display of display device 102. Additionally, control device 104 may include physical buttons for turning display device 102 on and off, channel selection buttons, volume control buttons, channel shortcut buttons, accessing menus, and programmable "favorites" buttons that store a shortcut to favorite channels, etc.

Mobile device 108 may be a portable computing device having a screen that is not preferably- or optimally-sized for viewing multimedia content, such as pictures or video. For example, mobile device 108 may be a lightweight device such as a smartphone, a tablet, a laptop, or another portable device. In an embodiment, the display screen of mobile device 108 is not optimal because it is smaller than the display screen of display device 102. Therefore, content consumers commonly prefer to operate display device 102 to view multimedia content.

As described above, the content consumer needs to use control device 104 with its limited input options and inefficient interfaces to adjust picture settings (and other hardware settings) of display device 102. To enable the content consumer to directly control the picture settings of display device 102 from his or her mobile device 108, mobile device 108 may implement or install display controller application 110. As described with respect to FIGS. 2 and 12A-B, display controller application 110 establishes a two-way communication channel with display device 102 via communications interface 106.

In an embodiment, application controller application 110 may receive, via the established communication channel, information related to picture settings or other display settings from display device 102. Based on this information, display controller application 110 may present current picture settings to the content consumer on a touchscreen-based interface, e.g., a mobile display screen that is a touchscreen display, of mobile device 108. In an embodiment, display controller application 110 may enable other types of input interface means (e.g., keyboard or mouse) to be used to operate with the picture settings displayed on the mobile display screen.

Additionally, display controller application 110 may implement a graphical user interface (GUI) that is touch-based and configurable for controlling the picture settings on the display device 102. Responsive to the content consumer's adjustments made on mobile device 108 of pictures settings displayed on mobile device, display controller application 110 may generate a command for sending to display device 102. Display device 102 includes software, hardware, or a combination thereof for interpreting the command to update the picture settings of display device 102.

In an embodiment, mobile device 108 may receive a software upgrade to the GUI from, for example, network 114. Mobile device 108 may then update the GUI of display controller application 110.

FIG. 2 is a block diagram of a system 200 illustrating components within display device 202 and mobile device 230, according to an example embodiment. In an embodiment, display device 202 and mobile device 230 may be example implementations of display device 102 and mobile device 108 from FIG. 1, respectively.

In an embodiment, to provide control of display device settings (e.g., picture settings), each of display device 202 and mobile device 230 includes one or more processors and memory coupled to respective one or more processors. Memory 204 may be hardware configured and arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In an embodiment, display device 202 includes memory 204 that stores information related to display setting including, for example, picture settings, audio settings, sleep timer, power on/off, or other hardware settings. In an embodiment, setting information may include the following types: display setting options 206, current display settings 208, and default display settings 210.

Display setting options 206 may store each display setting and possible configurable values, i.e., possible states, for each display setting. Possible configurations may include discrete, selectable options or a range of values. For example, display setting options 206 may store "Color Temperature," an example picture setting, in association with three configurable options: normal, warm, and cool. These three options represent the possible configuration values for the specific picture setting "Color Temperature."

Current display settings 208 may store a currently selected option, i.e., a current state, for each display setting. For example, current display settings 208 may store the "warm" option as the currently selected option for the picture setting, "Color Temperature."

Default display settings 210 may store the default selected option, i.e., a default state, for each display setting. For example, default display settings 210 may store a default option of "normal" for the picture setting "Color Temperature." In an embodiment, when display device 202 is reset by, for example, a manufacturer or a content consumer, display device 202 applies default display settings 210 to each corresponding display setting.

In an embodiment, to provide synchronized control of display settings to a plurality of remotes including (e.g., one or more mobile devices 230, or one or more control device 104 of FIG. 1, etc.), memory 204 further stores connected remote 212. In an embodiment, connected remote 212 stores an remote identifier (ID) that identifies a device that is currently accessing or controlling one or more display settings of display device 202. The remote ID may be, for example and without limitation, an Internet Protocol (IP) address, a media access control (MAC) address, an email address, or a username.

In an embodiment, memory 204 further stores registered display settings for each connected remote 212. A registered display setting may indicate a corresponding connected remote 212 should be notified of any adjustments to that registered display setting. By storing associations between registered display settings and connected remote 212, display device 202 may provide synchronized control of a display setting to one or more remotes.

In an embodiment, display device 202 may implement the following components: communications interface 220, display controller 222, adjustment detector 224, and command component 226, each of which may be stored in memory 204. Each component may include a selection of stored operations that when executing in the one or more processors of display device 202 causes the one or more processors to perform the operations of that component.

Communications interface 220 may be configured to enable direct or indirect wireless communications between display device 202 and mobile device 230 and, in an embodiment, additionally with control device 104 of FIG. 1. For example, communications interface 220 may connect to network 116 and/or network 114 of FIG. 1 to enable the wireless communications. Particularly, communications interface 220 may implement network circuitry for encoding and/or decoding information and receiving and/or transmitting the encoded information as radio signals in frequencies consistent with the one or more wireless communications standards and technologies (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, display device 202 may receive a communications request from a remote, such as mobile device 230, via communications interface 220. Upon receipt of the request, communications interface 220 may establish a wireless connectivity between display device 202 and mobile device 230. This wireless connectivity may provide a two-way communications channel that enables display device 202 and mobile device 230 to transmit commands and exchange data wirelessly.

Command component 226 may process commands issued from mobile device 230 and received via communications interface 220. For example, a received command may be to establish a wireless connectivity, as described above. When communications interface 220 establishes the connectivity, command component 226 may save mobile device 230 as one of connected remote 212 in memory 204. When communications interface 220 receives indication that mobile device 230 is no longer connected to display device 202, command component 226 may remove mobile device 230 as one of connected remote 212.

In an embodiment, the received command may be to query information related to display settings. In an embodiment, command component 226 queries one or more of display setting options 206, current display settings 208, and default display settings 210 to locate requested information. Then, command component 226 may transmit, via the established wireless connectivity in communications network 220, a response to mobile device 230. The response may include, for example, whether the request was successfully processed and if so, the information queried from memory 204.

In an embodiment, command component 226 may receive, from mobile device 230, a command to register mobile device 230 to receive one or more notifications for a specific display setting or a group of display settings. To register mobile device 230, command component 226 may associate the specific display setting or group of display settings with one of connected remote 212 representing mobile device 230.

In an embodiment, whenever the specific display setting or one or more display settings within the registered group of display settings are updated or adjusted, command component 226 may query memory 204 for registered connected remote 212. For example, display device 202 may update one or more display settings based on a command from a remote, such as mobile device 230 or control device 104, to calibrate the one or more display settings. In an embodiment, command component 226 may additionally or alternatively be notified of one or more connected remote 212 when one or more display settings are adjusted or updated.

For example, command component 226 may receive a list of the one or more connected remote 212 from adjustment detector 224.

Upon identifying one or more connected remote 212, command component 226 may transmit corresponding notifications that indicate how the registered one or more display settings have been adjusted. For example, a notification for a display setting may include an adjustment amount or the adjusted value (i.e., corresponding current display settings 208) for that display setting.

In an embodiment, to conserve or minimize bandwidth usage between display device 202 and mobile device 230, command component 226 may be capable of receiving and processing a command to deregister mobile device 230 from one or more notifications. For example, a received command may request that mobile device 230 be deregistered from receiving notifications of adjustments for "noise reduction," an example picture setting. Accordingly, command component 226 may remove, i.e., deregister, the association between mobile device 230 and the display setting in connected remote 212.

In an embodiment, command component 226 may be capable of processing commands to adjust display settings received from mobile device 230 or control device 104 of FIG. 1. The command may include an adjustment amount to apply to a display setting or a selected option to calibrate the display setting. Responsive to the received command, command component 226 may request display controller 222 to change the display settings.

Display controller 222 may be configured to control how a display screen of display device 202 displays multimedia content. In an embodiment, display controller 222 sets or configures current display settings 208 when requested by command component 226. In an embodiment, when requested by command component 226, display controller 222 may present a user interface on the display screen to enable control of display settings to control device 104, which may be a remote having a static and/or limited user interface. Though the user interface may not be localized or presented interactively on control device 104, the presented user interface may allow traditional remotes access and control to display settings within display device 202.

Adjustment detector 224 may detect whether one or more display settings or groups of display settings have been adjusted. For example, one or more display settings may be adjusted when the corresponding one or more current display settings 208 have been changed. In an embodiment, adjustment detector 224 may query memory 204 for one or more connected remote 212 registered to receive notification of the one or more adjusted display settings. Then, adjustment detector 224 may transmit a set or list of registered connected remote 212 to each registered connected remote 212, such as mobile device 230, via communications interface 220.

In an embodiment, adjustment detector 224 sends the registered connected remote 212 to command component 226 to generate a notification for sending to the registered connected remote 212. The notification indicates how the adjusted one or more picture settings are adjusted and includes, for example, one or more adjustment amounts or one or more corresponding current display settings 208.

In an embodiment, to provide the content consumer interactive control of display settings on mobile device 230, mobile device 230 may download and install display controller application 232 via, for example, network 114 or the Internet. Similar to display device 202, display controller application 232 may include memory 234 storing display setting options 236, default display settings 238, and current display settings 240. Each of these storage components may include a portion of the information received from the similarly named components of display device 202.

In an embodiment, display controller application 232 may implement the following components: communications interface 242, graphical user interface (GUI) controller, command component 246, and gesture detector 248. Each component may include a selection of stored operations that when executing in the one or more processors of mobile device 230 causes the one or more processors to perform the operations of that component.

Communications interface 242 may be configured to enable direct or indirect wireless communications between mobile device 230 and display device 202. For example, communications interface 242 may connect directly with display device 202 via a point-to-point communications technology, such as Bluetooth. In another example, communications interface 242 may provide wireless communications indirectly via, for example, router/modem device 112 or multimedia device 105. In an embodiment, communications interface 242 may implement network circuitry for encoding and/or decoding information and receiving and/or transmitting the encoded information as radio signals in frequencies consistent with the one or more wireless communications standards and technologies (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, upon starting display controller application 232 or upon request by content consumer, communications interface 242 may transmit a request to establish wireless connectivity with display device 202. Display device 202 may process the request enabling communications interface 242 to establish a two-way communications channel between mobile device 230 and display device 202.

GUI controller 244 may provide, on a touchscreen of mobile device 230, a GUI for presenting and controlling the display settings (and hardware settings) of display device 202. In an embodiment, GUI controller 244 provides a GUI that is user-friendly, touch-based, and configurable based on direct input from the content consumer or from a software update received over network 114 or network 116 of FIG. 1. For example, responsive to receiving a software update to the GUI over, for example, the Internet, GUI controller 244 may change how the GUI displays the configurations of the display settings in the touchscreen based on the received software update. Additionally, GUI controller 244 may change the interface including, for example, the input means, for calibrating one or more display settings.

In an embodiment, based on input from the content consumer, GUI controller 244 not only adjusts the one or more display settings interactively controlled and presented in the GUI, but also GUI controller 244 may notify command component 246 to transmit a command to adjust the corresponding display settings at display device 202.

In an embodiment, GUI controller 244 may configure the displayed GUI to display configurations of the display settings currently set or configured at display device 202. Particularly, GUI controller 244 may configure the GUI to display one or more queried display setting options 236 and current display settings 240. Further examples are provided with respect to FIGS. 3-7. By processing display setting information at mobile device 230, GUI controller 244 provides interactive control and calibration of the display settings via a plurality of input means, including touch-based gestures (as described with respect to FIGS. 3-10) or vocally (i.e. voice recognition) as described with respect to (FIGS. 11A-C). In an embodiment, other input means provided by mobile device 230 may include coupled devices such as a keyboard or a mouse.

In an embodiment, GUI controller 244 may receive updates or adjustments to be made to one or more presented display settings based on notifications received and processed by command component 246. A notification may indicate how a display setting is adjusted on display device 202, for example including an adjustment amount or the current display setting configured on display device 202. Similar to how GUI controller 244 may apply queried display setting information to the GUI, GUI controller 244 may reconfigure the presented GUI to reflect the updates or adjustments received in the notification. Therefore, GUI controller 244 configures the presented GUI to include display setting information that reflects the currently configured values of display device 202.

Gesture detector 248 may detect one or more gestures made within the GUI displayed on a touchscreen of mobile device 230. In an embodiment, a display screen of mobile device 230 is the touchscreen. In an embodiment, gesture detector 248 may utilize one or more gesture libraries implemented on mobile device 230. Upon detecting a gesture, gesture detector 248 may cause GUI controller 244 to update or control the presented GUI. In an embodiment, gesture detector 248 may send one or more detected gestures to command component 246.

In an embodiment, a gesture may be a user interaction detected within the GUI. For example, a touchscreen-based gesture may be, without limitation, a tap, a double tap, a tap-and-hold, a press and tap, a pan, a drag, a swipe, or a flick. In an embodiment, the gesture may be a user interaction detected on a hardware button. For example, a hardware-based gesture may include, without limitation, a press or a press-and-hold. In an embodiment, the gesture may a multi-touch gesture. For example, a multi-touch gesture may be, without limitation, a two-finger swipe, a three-finger tap, a press and tap, a rotate, a pinch with two or more fingers (i.e., pinching in), or a spread with two or more fingers (i.e., pinching out).

Command component 246 may generate a command to register mobile device 230 to receive a notification whenever one or more specified display settings of display device 202 are adjusted on display device 202. In an embodiment, this register command may be generated upon request by user or automatically. For example, command component 246 may automatically generate and send a register command to register mobile device 230 for all the display settings currently presented in the GUI managed by GUI controller 244.

In an embodiment, command component 246 may transmit this register command to display device 202 via communications interface 242. In an embodiment, the register command may include a device ID (e.g., an IP address, a MAC address, an email address, a username, or other information identifying mobile device 230), and one or more display settings or groups of display settings.

In an embodiment, to conserve or minimize bandwidth-use between display device 202 and mobile device 230, command component 246 may generate and transmit a command to deregister mobile device 230 from one or more display settings or groups of display settings. Much like the register command, the deregister command may include a device ID and one or more display settings or groups of display settings of interest. In an embodiment, this deregister command may be generated based on request from the content consumer or automatically. For example, when content consumer closes out of a certain menu option or display controller application 232, command component 246 may generate a deregister command for one or more inactive, exited, or non-displayed display settings.

Command component 246 may generate a command to query information related to display settings of display device 202. Then, command component 246 may transmit the command to display device 202 via communications interface 242. In an embodiment, the specific display settings or groups of display settings (and related information) to be retrieved are based on interactions, (e.g., one or more gestures), between a content consumer and a GUI displayed on a screen of mobile device 230. For example, when the content consumer selects an option to view and/or configure "Color Management" settings, an example group of display settings, in the GUI, command component 246 may generate a command to query information related to the "Color Management" settings. The related information may be, for example, possible display setting options 236 and current display settings 240 for each display setting within the group of "Color Management" settings.

Upon receiving the queried information, command component 246 may send this queried information to GUI controller 244 for presenting to the content consumer. In an embodiment, command component 246 may receive, from display device, display settings information within a notification command without prior querying by command component 246. For example, mobile device 230 may be registered to receive a notification whenever a specific one or more display settings are adjusted at display device 202. Whether command component 246 receives queried information or notification information, GUI controller 244 may similarly reconfigure the GUI such that the presented configurations of display settings matches that of the actual display settings at display device 202.

In an embodiment, command component 246 may generate a command to calibrate or adjust one or more display settings based on one or more adjustments or calibrations received by GUI controller 244 within the touchscreen. The adjustments or calibrations may be detected and interpreted based on, for example, one or more gestures received and detected by gesture detector 248. In an embodiment, the calibration command may include an adjustment/calibration amount for a specific display setting or the option or value of the adjusted/calibrated display setting. By transmitting the calibration command to display device 202, command component 246 effectively controls display device 202 to control the display settings at display device 202 according to the GUI presented by GUI controller 244.

In an embodiment, command component 246 may generate a command to reset one or more display settings of display device 202. For example, command component 246 may generate the reset command based content consumer input received by GUI controller 244. Once the command is transmitted to display device 202, GUI controller 244 may configure the one or more reset display settings with the corresponding default values or options stored in default display settings 238. GUI controller 244 may then configure the GUI for displaying the default values.

In an embodiment, to determine the adjustment made to one or more display settings or whether an adjustment was made, command component 246 may query default display settings 238. For example, command component 246 may compare default display settings 238 (queried from default display settings 210) with current display settings 240 to determine which of the one or more display settings have been adjusted.

Figure 3:
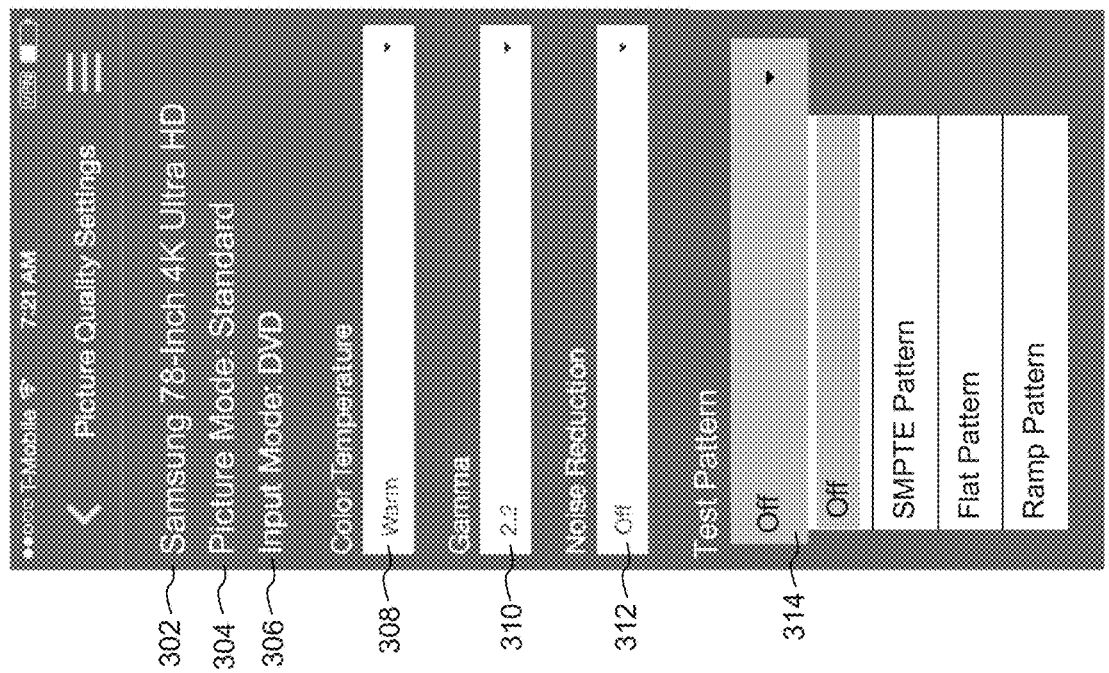
FIG. 3 is a diagram of a graphical user interface (GUI) for controlling picture settings, according to an example embodiment.

FIG. 3 is a diagram of a GUI 300 for controlling picture settings or picture quality settings, an example of display settings on display device 102 of FIG. 1, according to an example embodiment. GUI 300 may be configured and provided by GUI controller 244 on a touchscreen of mobile device 230 from FIG. 2.

Upon receiving display setting information queried from display device 102 by command component 246, GUI controller 244 configures GUI 300 to display type of display device 302 ("Samsung 78-Inch 4K Ultra HD"), picture mode 304 ("Standard"), and input mode 306 "DVD." As shown, based on queried current display settings 208, GUI controller 244 configures GUI 300 to display current selections for the following three picture settings 308-314: color temperature 308 ("Warm"), gamma 310 ("2.2"), noise reduction 312 ("Off"), and test pattern 314 ("Off"). Though not depicted as configurable, picture mode 304 and/or input mode 306 may be configurable via a dropdown menu or other input means, according to an example embodiment.

In an embodiment, picture settings 308-314 may be configurable for a combination of picture mode 304 and input mode 306. Therefore, in an embodiment, when any one of picture mode 304 or input mode 306 changes, GUI controller 244 reconfigures one or more picture settings 308-314 with current values retrieved from display device 102 for the specific combination of picture mode 304 and input mode 306.

In an embodiment, command component 246 queries possible selectable options, e.g., display setting options 206, for each of the presented picture settings 308-314. The touchscreen interface provided by GUI controller 244 enables a content consumer to view the possible selectable options for, for example, color temperature 308 by, for example, tapping the dropdown menu for color temperature 308. Other types of gestures may be detected or recognized instead. Table 1 below depicts picture settings information for picture settings 308-314, according to an example embodiment. In an embodiment, selecting an option may cause GUI controller 244 to present additional sub-options for the selected option. For example, there may be 10 selectable flat patterns. A person of ordinary skill in the art would understand that there may be more or less options for each of the picture settings in Table 1.

TABLE 1

Picture Settings Information

| Picture Settings | Default Options | Possible Options |
| --- | --- | --- |
| Color Temperature | Normal | <Normal \| Warm \| Cool> |
| Gamma | 2.2 | <1.8 \| 2.0 \| 2.2 \| 2.4> |
| Noise reduction | Off | <Auto \| Strong \| Medium \| Low\| Off> |
| Test Pattern | Off | <Off \| SMPTE Pattern \| Flat Pattern \| Ramp Pattern > |

Command component 246 may store and save queried display setting information (e.g., display setting options 206) in display setting options 236, default display settings 238, and/or current display settings 240.

FIGS. 4-7 are diagrams illustrating example GUIs that GUI controller 244 provides within a touchscreen interface of, for example, mobile device 108 to present and control various types of picture settings configurable at display device 102.

Figure 4:
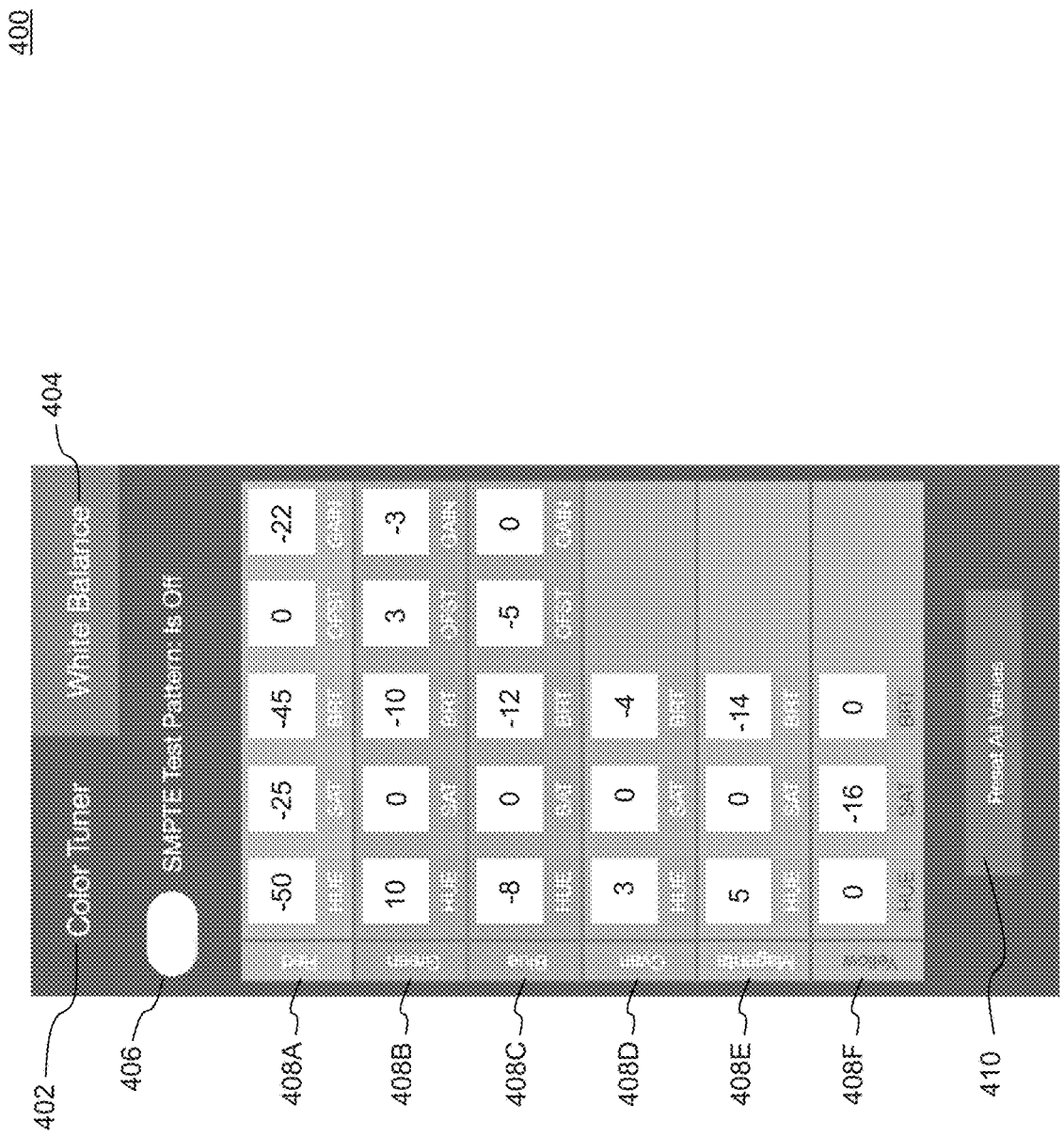
FIG. 4 is a diagram of a GUI for controlling color settings, according to an example embodiment.

FIG. 4 is a diagram of a GUI 400 for presenting and controlling color settings 408A-408F. GUI 400 shows that color tuner 402 tab is currently active or in the foreground while the white balance 404 tab is not active. In an embodiment, GUI 400 may be accessed from GUI 300 by one or more gestures, such as scrolling or dragging downwards (or upwards) on GUI 300. SMPTE switch 406 may enable the content consumer to swipe the switch GUI element on a touchscreen to view a SMPTE test pattern on display device 102. Based on the test pattern shown, the content consumer may adjust one or more configurable settings of each of color settings 408A-F. Table 2 below depicts information for each of picture settings 408A-F and associated one or more configurable settings. In an embodiment, as shown in Table 2, calibration values may range from −50 to 50, although other ranges may be possible. In an embodiment, default display settings 210 for a configurable setting may be a value of 0 (or any other value within the possible value range for that configurable setting).

In an embodiment, command component 246 may generate a command to calibrate picture setting 501 based on the selected option as depicted in current option 504. In an embodiment, as the content consumer scrolls through scrollbar 506, current option 504 may be changed rapidly in a short span of time. To minimize wasteful commands being generated and sent by command component 246, command component 246 may throttle the calibration command based on a threshold. For example, the threshold may be a number of commands generated within a predetermined amount of time for picture setting 501 or a minimum amount of time between transmitting each generated calibration command, e.g., 100 ms.

Figure 6:
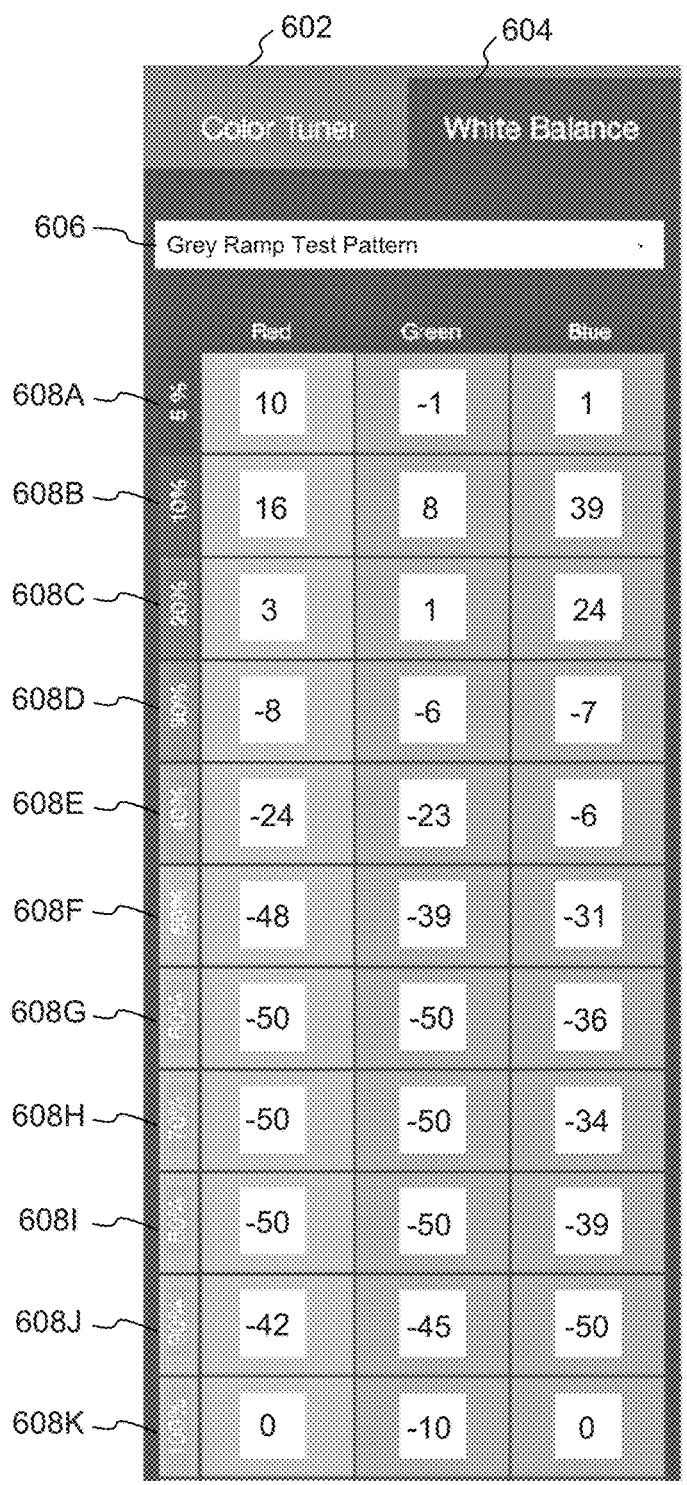
FIG. 6 is a diagram of a GUI for controlling white balance settings, according to an example embodiment.

FIG. 6 is a diagram of a GUI 600 for presenting and controlling white balance settings 608A-K. GUI 600 shows that white balance 604 tab is currently active or in the foreground while color tuner 602 tab is not active. In an embodiment, GUI 600 may be accessed from GUI 300 by one or more gestures, such as scrolling or dragging down-

TABLE 2

| Color Settings Information | | | | | | |
|---|---|---|---|---|---|---|
| | RED | GREEN | BLUE | CYAN | MAGENTA | YELLOW |
| HUE | −50 <= \|0\| => +50 | −50 <= \|0\| => +50 | −50 <= \|0\| => +50 | −50 <= \|0\| => +50 | −50 <= \|0\| => +50 | −50 <= \|0\| => +50 |
| SATURATION | −50 <= \|0\| => +50 | −50 <= \|0\| => +50 | −50 <= \|0\| => +50 | −50 <= \|0\| => +50 | −50 <= \|0\| => +50 | −50 <= \|0\| => +50 |
| BRIGHTNESS | −50 <= \|0\| => +50 | −50 <= \|0\| => +50 | −50 <= \|0\| => +50 | −50 <= \|0\| => +50 | −50 <= \|0\| => +50 | −50 <= \|0\| => +50 |
| OFFSET | −50 <= \|0\| => +50 | −50 <= \|0\| => +50 | −50 <= \|0\| => +50 | | | |
| GAIN | −50 <= \|0\| => +50 | −50 <= \|0\| => +50 | −50 <= \|0\| => +50 | | | |

In an embodiment, when the content consumer selects reset option 410 via a gesture (e.g., a tap), GUI controller 246 may reset each of the configurable settings to default display settings 238. As described with respect to FIG. 2, command component 246 may send a reset command, for example, to reset the values of corresponding current display settings 208 at display device 202.

Figure 5:
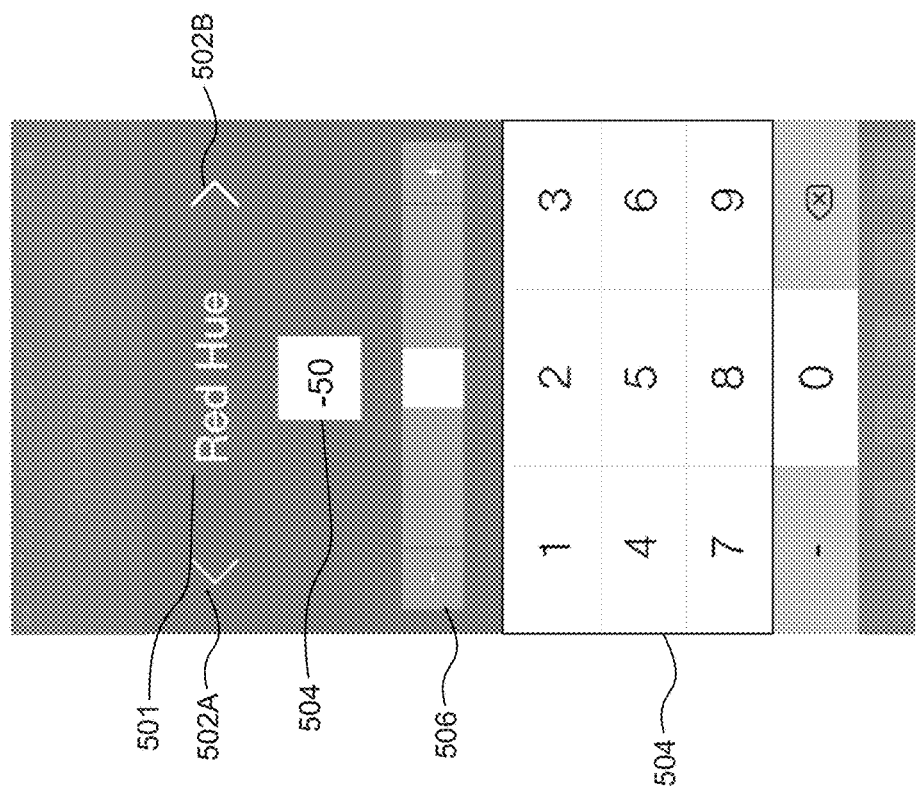
FIG. 5 is a diagram of a GUI for controlling a color setting, according to an example embodiment.

FIG. 5 is a diagram illustrating a GUI 500 for providing the content consumer a plurality of input means for controlling a current value for picture setting 501, e.g., "Red Hue," according to an example embodiment. GUI controller 244 may present GUI 500 to the content consumer upon detecting a tap to the configurable setting "Hue" of color setting 408A ("Red"). GUI 500 may present navigation buttons 502A-B to navigate from across color settings 408A-F and/or configurable settings within any of color settings 408A-F. In an embodiment, GUI controller 244 may detect one or more gestures for cycling through color settings 408A-F. For example, the content consumer may slide downwards within GUI 500 to cause GUI controller 244 to show the plurality of input means for controlling, for example, "Green Hue" instead of "Red Hue." By providing GUI 500 within the touchscreen of mobile device 108, display controller application 232 enable content consumers to quickly and efficient control display settings with low error. In an embodiment, GUI 500 may be similarly provided to control other types of display settings, such as any of white balance settings 608A-K in FIG. 6 described below.

In an embodiment, GUI controller 244 configures 500 to present a plurality of input means for controlling a current configuration or selected option of picture setting 501. GUI 500 may provide, for example, slider 506 and/or number pad 504 to input or select current option 504. Number pad 504 may include virtual buttons for incrementally changing displayed current option 504.

wards (or upwards) on GUI 300. Test pattern 606, such as "Grey Ramp Test Pattern," may be selected by tapping the dropdown menu of test pattern 606. This dropdown menu enables the content consumer to select from one of many test patterns for viewing on display device 102. Based on the test pattern shown, the content consumer may adjust one or more configurable settings (e.g., "Red," "Green," or "Blue") of each of white balance settings 608A-K. Although GUI 600 depicts 11 Pt White Balance options, other types of White Balance options may be presented instead. Table 3 below depicts information for each of white balance settings 608A-K and associated one or more configurable settings. In an embodiment, as shown in Table 3, calibration values may range from −50 to 50, although other ranges may be possible. In an embodiment, default display settings 210 for a configurable setting may be a value of 0 (or any other value within the possible value range for that configurable setting).

TABLE 3

| White Balance Settings Information 11 PT White Balance | | | |
|---|---|---|---|
| GAIN | RED | GREEN | BLUE |
| 5% | −50 <= \|0\| => +50 | −50 <= \|0\| => +50 | −50 <= \|0\| => +50 |
| 10% | −50 <= \|0\| => +50 | −50 <= \|0\| => +50 | −50 <= \|0\| => +50 |
| 20% | −50 <= \|0\| => +50 | −50 <= \|0\| => +50 | −50 <= \|0\| => +50 |
| 30% | −50 <= \|0\| => +50 | −50 <= \|0\| => +50 | −50 <= \|0\| => +50 |
| 40% | −50 <= \|0\| => +50 | −50 <= \|0\| => +50 | −50 <= \|0\| => +50 |
| 50% | −50 <= \|0\| => +50 | −50 <= \|0\| => +50 | −50 <= \|0\| => +50 |
| 60% | −50 <= \|0\| => +50 | −50 <= \|0\| => +50 | −50 <= \|0\| => +50 |
| 70% | −50 <= \|0\| => +50 | −50 <= \|0\| => +50 | −50 <= \|0\| => +50 |
| 80% | −50 <= \|0\| => +50 | −50 <= \|0\| => +50 | −50 <= \|0\| => +50 |
| 90% | −50 <= \|0\| => +50 | −50 <= \|0\| => +50 | −50 <= \|0\| => +50 |
| 100% | −50 <= \|0\| => +50 | −50 <= \|0\| => +50 | −50 <= \|0\| => +50 |

In an embodiment, similar to FIG. 4, GUI 600 may include a reset option that when selected by the content consumer via a gesture (e.g., a tap), GUI controller 246 may reset each of the configurable settings to default display settings 238. As described with respect to FIG. 2, command component 246 may send a reset command, for example, to reset the values of corresponding current display settings 208 at display device 202.

Figure 7:
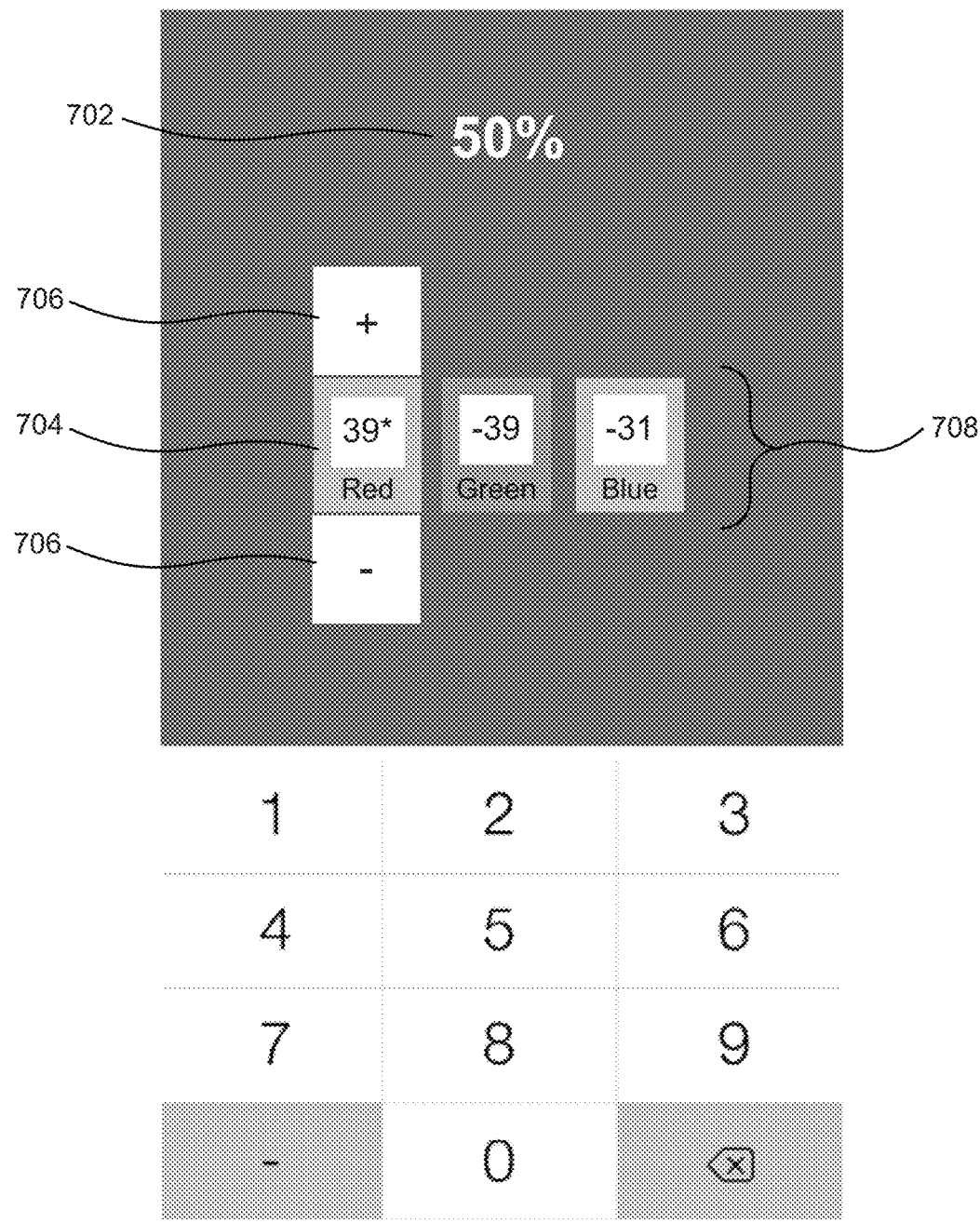
FIG. 7 is a diagram of a GUI for controlling a white balance setting, according to an example embodiment.

FIG. 7 is a diagram illustrating a GUI 700 for providing the content consumer a plurality of input means for controlling one or more current values for picture setting 702, e.g., "50%," according to an example embodiment. GUI controller 244 may present GUI 700 to the content consumer upon detecting a tap to the form box of configurable setting "Red" of white balance setting 608F ("50%"). Similar to GUI 500 of FIG. 5, GUI 700 provides a plurality of input means including, without limitation, increment/decrement buttons 706 and a number pad. In a slight variation from FIG. 5, GUI 700 provides control of each of possible configurable settings 708 for the specific picture setting 702. In this case, for white balance setting 608F, possible configurable settings 708 include "Red," "Green," and "Yellow" settings. In an embodiment, asterisk 704 in GUI 700 may indicate that the current value of "39" differs from the default value of, in this case, "0." In an embodiment, the asterisks indicator may be presented by GUI controller 244 across any of the GUIs of FIGS. 3-7. In an embodiment, GUI 700 may be similarly provided to configure the color settings 408A-408F of FIG. 4 or other types of display settings.

Figure 8A:
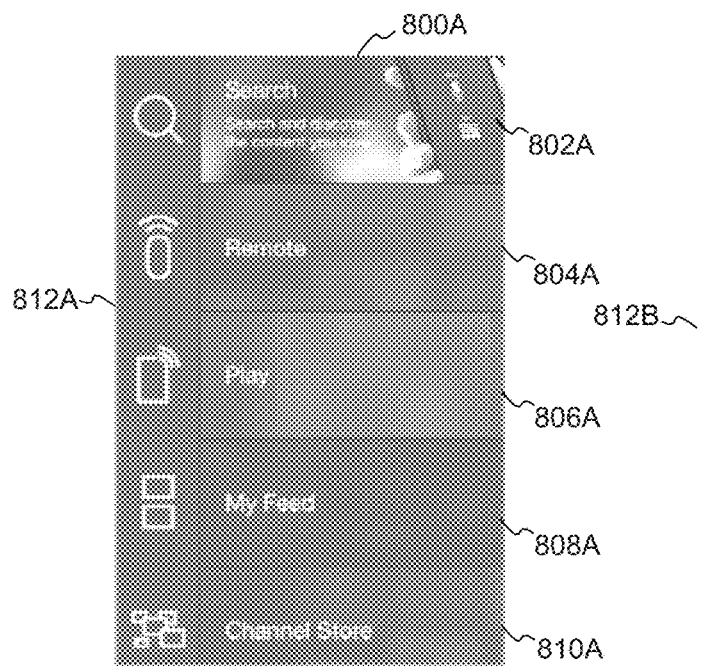
FIGS. 8A-C are diagrams illustrating navigation within a GUI for controlling a display device, according to an example embodiment.
Figure 8B:
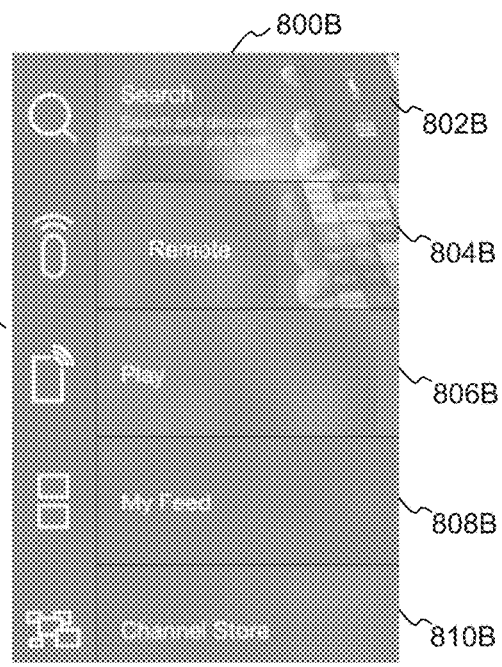
Figure 8C:
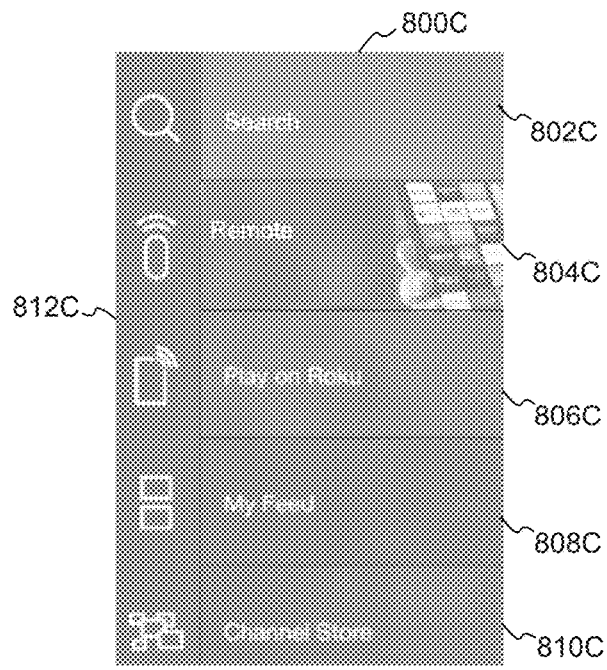

FIGS. 8A-C are diagrams illustrating navigation within GUIs 800A-C for controlling display device 102, according to example embodiments. In an embodiment, GUI controller 244 may provide GUI 800 that enables the content consumer to control display settings and/or hardware settings on display device 102 and/or control the type of multimedia content displayed on display device 102. For example, GUI controller 244 may receive content consumer inputs from GUI 800 and control multimedia device 105 to present requested multimedia content on display device 102.

GUI 800 provides the content consumer various icons within icon panel 812. Each of the icons may correspond to respective sliding panels such as search panel 802, remote panel 804, play panel 806, my feed panel 808, and channel store panel 810. GUI 800 allows the content consumer to tap or swipe any panel 802-810 to access respective controls or activities.

In an embodiment, GUI 812A of FIG. 8A may display search panel 802A of being selected. When one of panels 802-810 is selected, GUI controller 244 may retrieve additional content related to the selected panel, such as search panel 802A, for displaying. As shown search panel 802A displays related content.

In an embodiment, the content consumer may select remote panel 804A. In GUI 800B of FIG. 8B, GUI 800 may fade or remove content of previously selected search panel 802B. Concurrently, GUI 800 may enhance, e.g., make more opaque, remote panel 804B. GUI 800C of FIG. 8C may display a final state of GUI 800C where search panel 802C is shown as de-selected and remote panel 804C is shown as fully opaque and with additional content.

Figure 9:
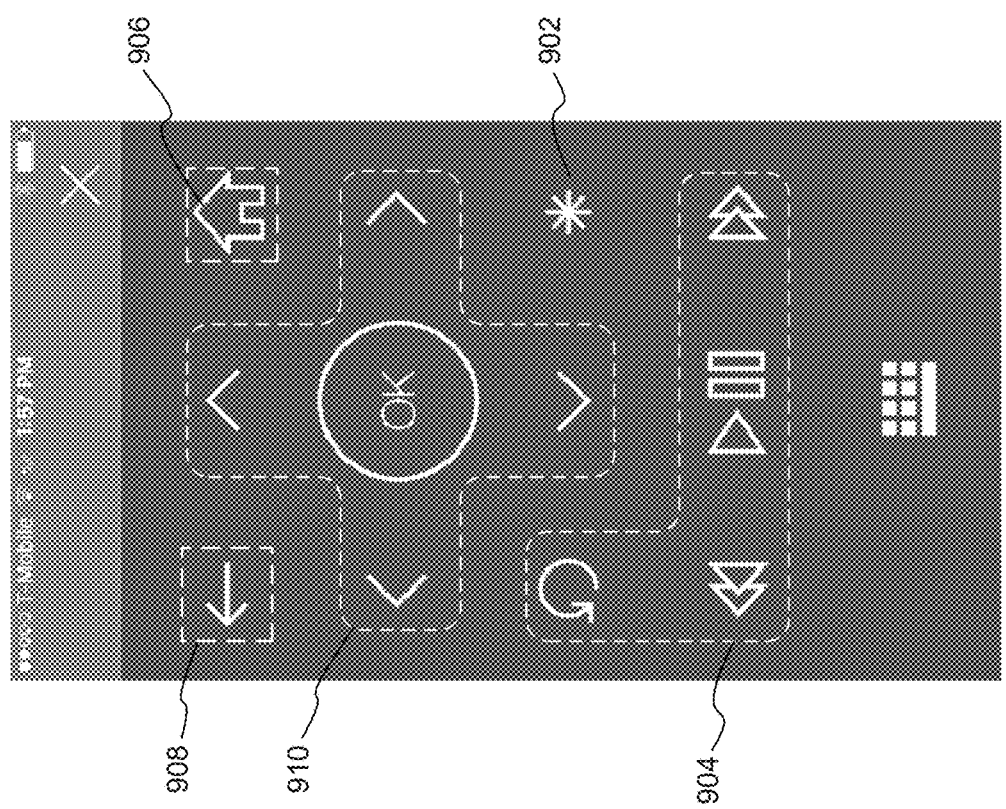
FIG. 9 is a diagram of a GUI for controlling operations of a display device, according to an example embodiment.
Figure 10:
FIG. 10 is a diagram of a GUI for controlling operations of a display device, according to an example embodiment.
Figure 11A:
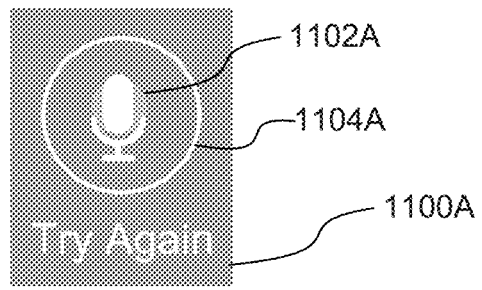
FIGS. 11A-C are diagrams illustrating feedback provided within a GUI for controlling a display device, according to an example embodiment.
Figure 11B:
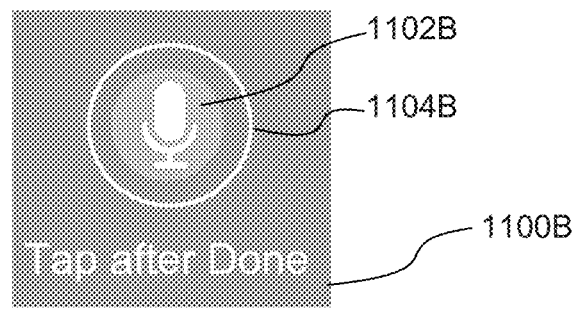
Figure 11C:
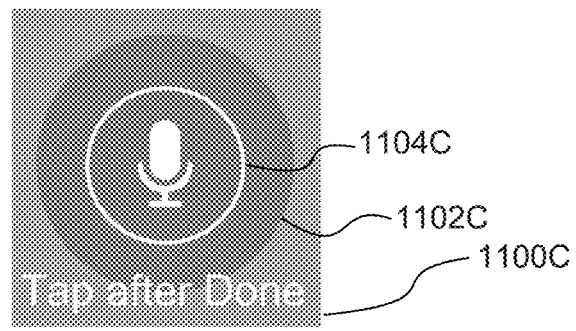

FIGS. 9-10 are diagrams of respective GUIs 900 and 1000 for controlling operations of display device 102, according to an example embodiment. In an embodiment, GUI controller 244 may present GUI 900 upon selecting remote panel 814 of GUI 812 and/or sliding to the right (or left) within remote panel 814. In an embodiment, display controller application 232 may establish wireless connectivity with, for example, multimedia device 105. Then, GUI controller 244 may present GUI 900 for the particular multimedia device 105. As shown, GUI 900 may include the following GUI elements: options 902, content playing 904 (including "instant replay," "rewind," "play/pause," and "fast forward"), home 906, and back 908. In an embodiment, the types of GUI elements may be presented based on the types of available operations provided by connected display device 102 or multimedia device 105.

In an embodiment, display controller application 232 may establish wireless connectivity with, for example, display device 102 capable of providing mobile device 108 control of display settings or other operations within display device 102. Then, GUI controller 244 may present GUI 1000 including similar remote controls as GUI 9000 and additionally power button 1004 and volume controls 1008. In an embodiment and as shown, GUI controller 244 may dynamically resize and distribute the buttons and GUI elements of GUI 1000 based on a screen resolution and/or size of touchscreen of mobile device 230 of all form factors.

FIGS. 11A-C are diagrams illustrating feedback provided within GUIs 1100A-C for controlling a display device, according to an example embodiment. In an embodiment, each of GUIs 1100A-C may be provided and controlled by GUI controller. In an embodiment, GUIs 1100A-C may depict interfaces for providing visual feedback of voice input or queries. In an embodiment, GUIs 1100 may provide shapes that links decibel level with one or more of a scale and opacity level. For example, GUI controller 244 may depict a small circle 1102A as shown in GUI 1100A to indicate that the content consumer's voice query is too quiet.

In an embodiment, as the content consumer's decibel level increases, GUI controller 244 may increase the size and/or opacity level of circle 1102B as shown in GUI 1100B. Similarly, when the content consumer's voice volume increases, GUI controller 244 may further increase the size and/or opacity level of circle 1104C as shown in FIG. 11C.

In an embodiment, circles 1104A-C may depict a minimum voice decibel level required or recommended for display controller application 232 providing GUIs 1100A-C to process a voice query. In FIGS. 11A-B, circle 1102A-B may be smaller than corresponding circles 1104A-C, indicating that the voice query may be too quiet to process and/or recognize. In contrast, in FIG. 11C, circle 1102C may be larger than circle 1104C indicating that the decibel level is loud enough for display controller application 232 to process.

In an embodiment, GUI controller 244 may configure any of the GUIs described with respect FIGS. 3-11 to optimize the experience of content consumers to calibrate display settings or operations of display device 202. For example, based on detected environmental factors, GUI controller 244 may change how display settings, controls, or other GUI elements within the GUIs are displayed. For example, when a light level in the environment surrounding mobile device 230 is low or dark, GUI controller 244 may increase the luminance levels of graphics and/or content displayed in one or more GUIs.

Additionally, in an embodiment, GUI controller 244 may provide one or more feedback means within any of the GUIs described with respect to FIGS. 3-10 to indicate that a content consumer's input has been recognized and/or processed. In an embodiment, feedback means may include visual feedback (e.g., popup window, flashing light, text indicator, etc.), audio feedback (e.g., a ping, a short sound, etc.), or haptic feedback (e.g., a vibration). For example, FIGS. 11A-C describe an example visual feedback indicating whether a vocal instruction was able to be processed.

In contrast, in an embodiment, a remote, such as control device 104 of FIG. 1, may have a static user interface, for example, with physical buttons, that cannot be configured to adjust to user configurations or environmental factors. And the remote also may not be able to provide feedback for whether a command has been recognized and/or processed. For example, although the content consumer may feel that a button has been pressed, the remote may provide no indication whether the particular instruction associated with the button was processed by display device 202, which may be controlled by that remote.

FIG. 12A is a flowchart of a method 1200A for providing control of display device settings of display device 1201 from mobile device 1203, according to an example embodiment. In an embodiment, display device 1201 and mobile device 1203 may, for example, display device 102 and mobile device 108 from FIG. 1, respectively. Mobile device 1203 may include, for example, display controller application 232 to provide the control of the display settings. For ease of reference, the steps will be explained with respect to the components of display device 202 and mobile device 230 described with respect to FIG. 2. Method 1200A can be performed by processing logic that may comprise hardware (e.g., circuitry, dedicated logic, programmable logic, microcode, etc.), software (e.g., instructions running on a processing device), or a combination thereof.

In step 1202, mobile device 1203 receives a request via, for example, GUI controller 244, to connect to display device 1201 to control configurable display settings of display device 1201. For example, the request may be initiated when starting display controller application 232 or when display controller application 232 moves from the background to the foreground of mobile device 1203.

In step 1204, mobile device 1203 establishes via, for example, communications interface 242, a connection, e.g., a wireless connectivity, with display device 1201. For example, mobile device 1203 transmits to display device 1201 a connectivity request including information identifying mobile device 1203.

In step 1222, display device 1201 establishes via, for example, communications interface 220 the wireless connectivity with mobile device 1203. In an embodiment, responsive to establishing the wireless connectivity, display device 202 may save mobile device 230 as an active remote connected to display device 1201 in, for example, connected remote 212.

In step 1206, mobile device 1203 receives via, for example, GUI controller 244, a request to access one or more display settings on display device 1201. For example, the request may be automatically generated based on the specific display settings presented within a GUI managed and presented by GUI controller 244.

In step 1208, mobile device 1203 transmits via, for example, communications interface 242, a command generated to query information related to the display settings of step 1206. In an embodiment, command component 246 generates the command.

In step 1224, display device 1201 retrieves via, for example, command component 226, the queried display settings and related information of step 1208.

In step 1226, display device 1201 transmits via, for example, communications interface 220, a response to mobile device 1203. The response may include the retrieved information of step 1224.

In step 1210, mobile device 1203 saves via, for example, command component 246, received information to one or more of display setting options 236, default display settings 238, or current display settings 240.

In step 1212, mobile device 1203 presents and configures via, for example, GUI controller 244, the GUI with received information of step 1210.

In step 1214, mobile device 1203 receives via, for example, GUI controller 244, user input or calibration to a display setting. For example, GUI controller 244 may receive user input based on one or more touch gestures detected and recognized by gesture detector 248. In an embodiment, GUI controller 244 may also updates the displayed configurations of the calibrated display settings in the GUI on a touchscreen interface of mobile device 1203.

In step 1216, mobile device 1203 generates via, for example, command component 246, a command including the calibration information of step 1214.

In step 1218, mobile device 1203 transmits via, for example, communications interface 242, the calibration command of step 1216 to display device 1201.

In step 1228, display device 1201 receives via, for example, communications interface 220, the calibration command.

In step 1230, display device 1201 updates via, for example, command component 226, one or more display settings based on the received calibration command. Display controller 222 may then apply the updated display settings to a display screen of display device 1201.

In step 1232, display device 1201 transmits via, for example, command component 226, feedback indicating whether the calibration command was successfully applied.

In step 1220, mobile device 1203 may receive the feedback and confirm via, for example, GUI controller 244, that the user's calibration input was applied at display device 1201.

FIG. 12B is a flowchart of a method 1200B for providing control of display device settings of display device 1201 from mobile device 1203, according to an example embodiment. In an embodiment, display device 1201 and mobile device 1203 may, for example, display device 102 and mobile device 108 from FIG. 1, respectively. Mobile device 1203 may include, for example, display controller application 232 to provide the control of the display settings. For ease of reference, the steps will be explained with respect to FIG. 12A and the components of display device 202 and mobile device 230 described with respect to FIG. 2. Method 1200B can be performed by processing logic that may comprise hardware (e.g., circuitry, dedicated logic, programmable logic, microcode, etc.), software (e.g., instructions running on a processing device), or a combination thereof.

In step 1240, similar to step 1202 of FIG. 12A, mobile device 1203 receives a request via, for example, GUI controller 244, to connect to display device 1201 to control configurable display settings of display device 1201.

In step 1242, similar to step 1202 of FIG. 12A, mobile device 1203 establishes via, for example, communications interface 242, a connection, e.g., a wireless connectivity, with display device 1201.

In step 1256, similar to step 1222 of FIG. 12A, display device 1201 establishes via, for example, communications interface 220 the wireless connectivity with mobile device 1203. In an embodiment, responsive to establishing the wireless connectivity, display device 202 may save mobile device 230 as an active remote connected to display device 1201 in, for example, connected remote 212.

In step 1244, mobile device 1203 registers via, for example, command component 246 mobile device 1203 to receive a notification whenever one or more specific display settings are adjusted at display device 1201.

In step 1246, mobile device 1203 transmits via, for example, communications interface 242, a command to register mobile device 1203 for the notification of step 1244. In an embodiment, command component 246 generates the register command.

In step 1258, display device 1201 registers via, for example, command component 226, mobile device 1203 to receive notifications for the one or more display settings indicated in the register command.

In step 1260, display device 1201 receives via, for example, adjustment detector 224, an update to a display setting.

In step 1262, display device 1201 queries via, for example, adjustment detector 224, memory 204 for connected remote 212 registered for the updated display setting.

In step 1264, display device 1201 transmits via, for example, communications interface 220 an update command to mobile device 230. Command component 226 may generate the command including the updates received in step 1260.

In step 1248, similar to step 1210 of FIG. 12A, mobile device 1203 saves via, for example, command component 246, received information to one or more of display setting options 236, default display settings 238, or current display settings 240.

In step 1250, similar to step 1212 of FIG. 12A, mobile device 1203 presents and configures via, for example, GUI controller 244, the GUI with received information of step 1210.

In step 1252, mobile device 1203 deregisters via, for example, command component 246, mobile device 1203 from receiving the registered notifications of step 1244. Command component 246 may, for example generate a deregister command.

In step 1254, mobile device 1203 transmits via, for example, communications interface 242, the deregister command of step 1252 to display device 1201.

In step 1266, display device 1201 deregisters via, for example, command component 226, mobile device 1203 from receiving notifications of the one or more display settings indicated in the deregister command.

Figure 13:
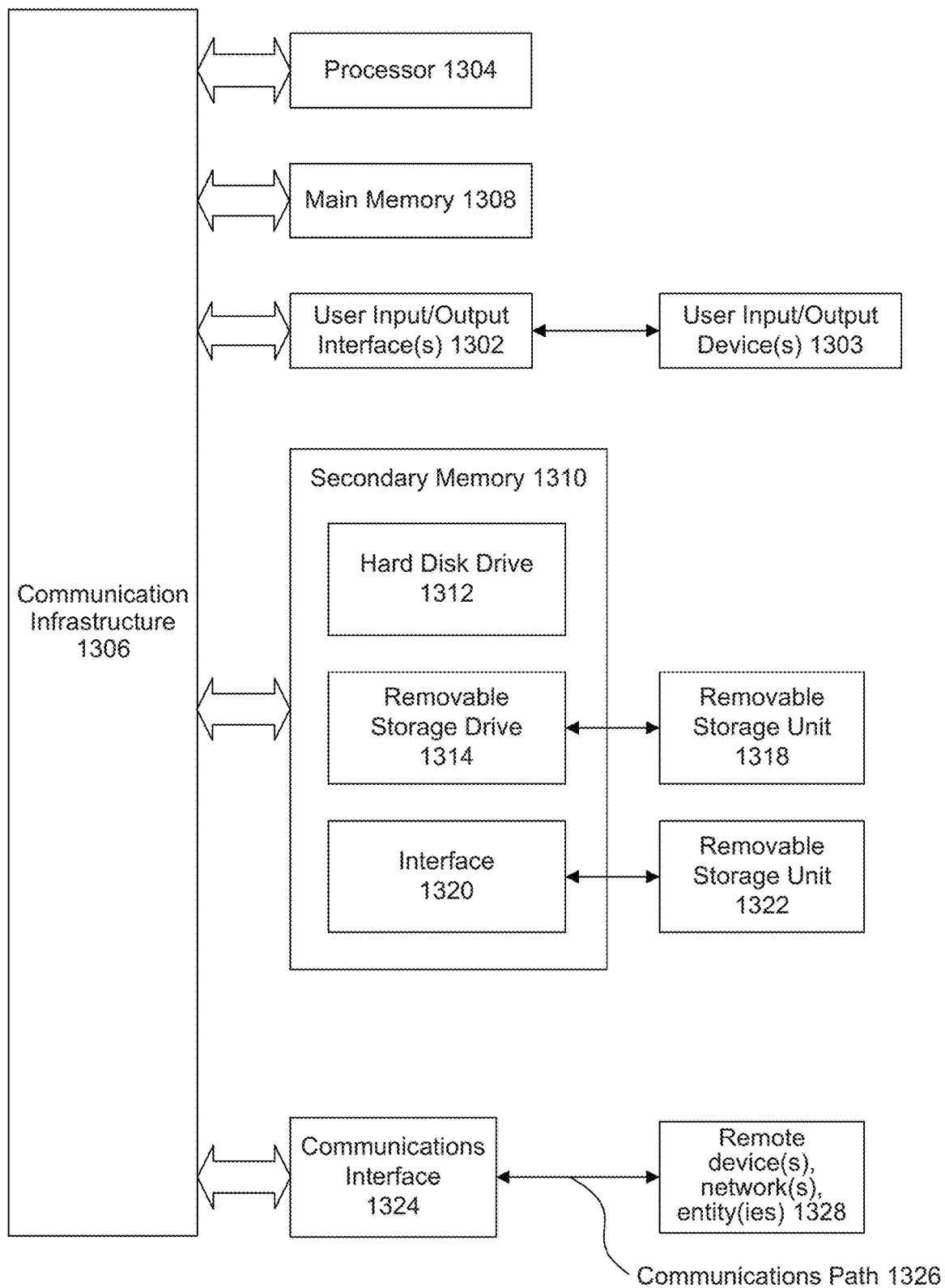
FIG. 13 illustrates an example computing system useful for implementing various embodiments.

Various embodiments and devices, such as, but not limited to, mobile device 108 or display device 102 of FIG. 1, and/or display device 202 or mobile device 230 of FIG. 2, or components therein, can be implemented, for example, using one or more well-known computer systems, such as computer system 1300 shown in FIG. 13. Computer system 1300 can be any well-known computer capable of performing the functions described herein.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or communications interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A display device having configurable display settings, comprising:
    a memory configured to store the display settings, wherein the display settings include a first display setting and a second display setting;
    at least one processor coupled to the memory;
    a communications interface that when executed by the at least one processor communicates with a first remote control and a second remote control, wherein the first remote control includes a display controller application;
    a command component that when executed by the at least one processor receives, from the display controller application on the first remote control, an adjustment value, wherein the command component is further configured to:
        perform an adjustment to the first display setting based on the adjustment value;
        determine that the first remote control is registered to receive a notification associated with the first display setting;
        transmit, based on the determining, the notification including the adjustment value to the first remote control;
        receive, from the second remote control, a request to display a static graphical user interface on the display device, wherein the static graphical user interface includes at least one of the first display setting and the second display setting;
        receive, from the second remote control, a command to control the static graphical user interface on the display device; and
        adjust, based on the command, at least one of the first display setting and the second display setting;
    a display controller that when executed by the at least one processor is configured to:
        offload, to the first remote control, information relating to the display settings to configure a first portion of a graphical user interface responsive to receiving a request to access the display settings from the first remote control, wherein the first portion of the graphical user interface includes a portion of the display settings;
        display, on the display device, a second portion of the graphical user interface responsive to detecting the first remote control controlling the display device, wherein the second portion of the graphical user interface is a simplified version of the graphical user interface; and
        display the static graphical user interface responsive to detecting the second remote control controlling the display device, wherein the static graphical user interface is different from the simplified graphical user interface.

2. The display device of claim 1, wherein the display settings further comprise a notification setting associated with the second display setting, wherein the notification setting is configured to indicate that the first remote control is to receive a second notification of an adjustment to the second display setting.

3. The display device of claim 2, wherein the command further comprises a register command associated with the notification setting, wherein the register command is configured to register the first remote control to receive the second notification.

4. The display device of claim 1, wherein the command component is further configured to:
    receive, from at least one of the first remote control and the second remote control, a connectivity command to establish a wireless connectivity;
    establish, based on the connectivity command, the wireless connectivity; and
    save, based on the establishing, the at least one of the first remote control and the second remote control as a connected remote in the memory.

5. The display device of claim 4, wherein the command component is further configured to:
    receive an indication that the at least one of the first remote control and the second remote control has disconnected from the wireless connectivity; and
    remove, based on the indication, the at least one of the first remote control and the second remote control as the connected remote in the memory.

6. The display device of claim 1, wherein the command further comprises a query command configured to request information related to the display settings and wherein the command component is further configured to transmit, to at least one of the first remote control and the second remote control, a response including the requested information.

7. The display device of claim 1, further comprising:
an adjustment detector configured to:
    detect the adjustment to the first display setting; and
    transmit, to the command component, a list of remote controls registered to receive the notification associated with the adjustment to the first display setting.

8. A method, performed by a display device, the method comprising:
    storing, in a memory of the display device, display settings for the display device, wherein the display settings include a first display setting and a second display setting and remote control information associated with a first remote control and a second remote control, wherein the first remote control includes a display controller application;
    receiving, by a communications interface of the display device from the display controller application on the first remote control, an adjustment value;
    performing, by a command component of the display device, an adjustment to the first display setting based on the adjustment value;
    determining that the first remote control is registered to receive a notification associated with the first display setting;
    transmitting, based on the determining, the notification including the adjustment value to the first remote control;
    receiving, from the second remote control, a request to display a static graphical user interface on the display device, wherein the static graphical user interface includes at least one of the first display setting and the second display setting;
    receiving, from the second remote control, a command to control the static graphical user interface on the display device;
    adjusting, based on the command, at least one of the first display setting and the second display setting;
    offloading, to the first remote control, information relating to the display settings to configure a first portion of a graphical user interface responsive to receiving a request to access the display settings from the first remote control, wherein the first portion of the graphical user interface includes a portion of the display settings;
    displaying, by a display controller of the display device, a second portion of the graphical user interface responsive to detecting the first remote control controlling the display device, wherein the second portion of the graphical user interface is a simplified version of the graphical user interface; and
    displaying, by the display controller, the static graphical user interface responsive to detecting the second remote control controlling the display device, wherein the static graphical user interface is different from the simplified graphical user interface.

9. The method of claim 8, wherein the display settings further comprise a notification setting associated with the second display setting, wherein the notification setting is configured to indicate that the first remote control is to receive a second notification of an adjustment to the second display setting.

10. The method of claim 9, wherein the command further comprises a register command associated with the notification setting, wherein the register command is configured to register the first remote control to receive the second notification.

11. The method of claim 8, further comprising:
    receiving, from at least one of the first remote control and the second remote control, a connectivity command to establish a wireless connectivity;
    establishing, based on the connectivity command, the wireless connectivity; and
    saving, based on the establishing, the at least one of the first remote control and the second remote control as a connected remote in the memory.

12. The method of claim 11, further comprising:
    receiving an indication that the at least one of the first remote control and the second remote control has disconnected from the wireless connectivity; and
    removing, based on the indication, the at least one of the first remote control and the second remote control as the connected remote in the memory.

13. The method of claim 8, wherein the command further comprises a query command configured to request information related to the display settings and wherein the command component is further configured to transmit, to at least one of the first remote control and the second remote control, a response including the requested information.

14. The method of claim 8, further comprising:
    detecting, by an adjustment detector of the display device, the adjustment to the first display setting; and
    transmitting, by the adjustment detector to the command component, a list of remote controls registered to receive the notification associated with the adjustment to the first display setting.

15. A non-transitory computer-readable medium having instructions stored thereon that, when executed by a display device, cause the display device to perform operations comprising:
    storing, in a memory of the display device, display settings for the display device, wherein the display settings include a first display setting and a second display setting and remote control information associated with a first remote control and a second remote control, wherein the first remote control includes a display controller application;
    receiving, by a communications interface of the display device from the display controller application on the first remote control, an adjustment value;
    performing, by a command component of the display device, an adjustment to the first display setting based on the adjustment value;
    determining that the first remote control is registered to receive a notification associated with the first display setting;
    transmitting, based on the determining, the notification including the adjustment value to the first remote control;
    receiving, from the second remote control, a request to display a static graphical user interface on the display device, wherein the static graphical user interface includes at least one of the first display setting and the second display setting;
    receiving, from the second remote control, a command to control the static graphical user interface on the display device;
    adjusting, based on the command, at least one of the first display setting and the second display setting;
    offloading, to the first remote control, information relating to the display settings to configure a first portion of a graphical user interface responsive to receiving a request to access the display settings from the first remote control, wherein the first portion of the graphical user interface includes a portion of the display settings;
displaying, by a display controller of the display device, a second portion of the graphical user interface responsive to detecting the first remote control controlling the display device, wherein the second portion of the graphical user interface is a simplified version of the graphical user interface; and
displaying, by the display controller, the static graphical user interface responsive to detecting the second remote control controlling the display device, wherein the static graphical user interface is different from the simplified graphical user interface.

16. The non-transitory computer-readable medium of claim 15, wherein the display settings further comprise a notification setting associated with the second display setting, wherein the notification setting is configured to indicate that the first remote control is to receive a second notification of an adjustment to the second display setting.

17. The non-transitory computer-readable medium of claim 16, wherein the command further comprises a register command associated with the notification setting, wherein the register command is configured to register the first remote control to receive the second notification.

18. The non-transitory computer-readable medium of claim 15, the operations further comprising:
receiving, from at least one of the first remote control and the second remote control, a connectivity command to establish a wireless connectivity;
establishing, based on the connectivity command, the wireless connectivity; and
saving, based on the establishing, the at least one of the first remote control and the second remote control as a connected remote in the memory.

19. The non-transitory computer-readable medium of claim 18, the operations further comprising:
receiving an indication that the at least one of the first remote control and the second remote control has disconnected from the wireless connectivity; and
removing, based on the indication, the at least one of the first remote control and the second remote control as the connected remote in the memory.

20. The non-transitory computer-readable medium of claim 15, wherein the command further comprises a query command configured to request information related to the display settings and wherein the command component is further configured to transmit, to at least one of the first remote control and the second remote control, a response including the requested information.

* * * * *